United States Patent [19]

Lutz et al.

[11] 4,398,285
[45] Aug. 9, 1983

[54] TIME-DIVISION MULTIPLEX SWITCHING NETWORK

[75] Inventors: Karl A. Lutz, Munich; Eberhard Knorpp, Gauting, both of Fed. Rep. of Germany

[73] Assignee: Siemens Aktiengesellschaft, Berlin & Munich, Fed. Rep. of Germany

[21] Appl. No.: 231,678

[22] Filed: Feb. 5, 1981

[30] Foreign Application Priority Data

Apr. 30, 1980 [DE] Fed. Rep. of Germany ....... 3016706

[51] Int. Cl.³ ........................................... H04Q 11/04
[52] U.S. Cl. ........................................ 370/58; 370/16
[58] Field of Search ..................... 370/16, 58, 13, 68, 370/66; 179/18 EA, 18 J, 175.3 S; 371/8

[56] References Cited

U.S. PATENT DOCUMENTS 4,071,702 1/1978 Charransol et al. .................. 370/16
4,245,339 1/1981 Agricola et al. ...................... 370/58
4,276,637 6/1981 Le Dieu ................................ 370/58

Primary Examiner—Jin F. Ng
Attorney, Agent, or Firm—Hill, Van Santen, Steadman, Chiara & Simpson

[57] ABSTRACT

A time-division multiplex switching network is constructed of units designed as time stages which operate blocking-free and which are multiply divided. A plurality of units of identical structure to a plurality of switching units of a switching network portion is assigned to each switching network portion, the plurality of units being operated as multiplexers at which the outgoing time-division multiplex lines are connected and whose normally non-utilized outputs can be connected by way of switches to other time-division multiplex lines extending from other switching network portions. Upon failure of the latter switching network portions, the switches are closed for rerouting the traffic through the system.

3 Claims, 3 Drawing Figures

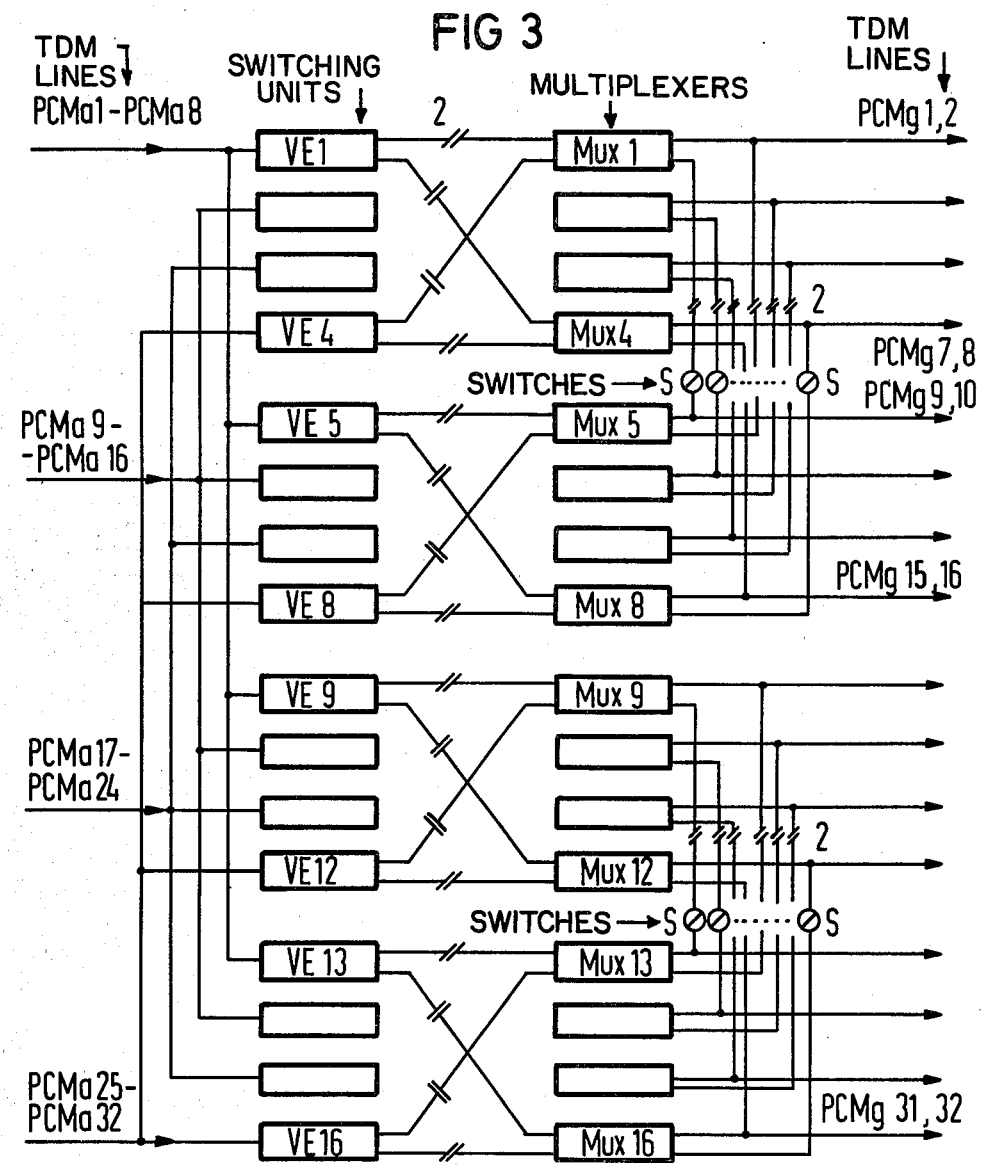

TIME-DIVISION MULTIPLEX SWITCHING NETWORK

BACKGROUND OF THE INVENTION

1. Field of the Invention

The present invention relates to a time-division multiplex switching network, particularly a pulse code modulation (PCM) time-division multiplex switching network comprising switching units designed as time stages operating blocking-free and respectively effecting the chronological and spatial assignment of time channels employed on time-division multiplex lines for a incoming transmission direction to a time-division multiplex lines for an outgoing transmission direction, a respective plurality of time-division multiplex lines being connected to the switch units, in which time-division multiplex switching network at least two one-stage switching network portions are formed which respectively embrace as many switching units are switching network portions and in which the time-division multiplex lines for the incoming transmission direction connected to the switching units are also respectively connected to one input of a switching unit of each other switching network portion.

2. Description of the Prior Art

In view of possibilities of increase, such a time-division multiplex switching network offers advantages in comparison to multi-stage switching matrix arrays constructed of the switching units. Such switching matrix arrays as are two-stage, in particular, on the one hand produce a greater delay time in the through-connection of the signal and, on the other hand, are sensitive to out-of-balance loads, i.e. that when, proceeding from a switching unit of a first stage, priority connections to time-division multiplex lines which are connected to one and the same switching unit of a second stage are to be produced at the same time, a blockage can occur because of the limited number of intermediate lines. This out-of-balance load sensitivity no longer exists given three-stage switching matrix arrays but, instead, the delay time through the switching matrix array is even greater and, in addition, correspondingly more connection commands are required for the through-connection of the channels.

In a known time-division multiplex switching matrix array of the type initially mentioned, equivalent outputs of the switching units within the individual switching network portions are connected to one another and are connected to a respective time-division multiplex line for the outgoing transmission direction. Because of the specified type of connection of the time-division multiplex lines for the incoming transmission direction to the switching units, therefore, given failure of a switching network portion, the traffic heretofore routed over that portion can be sequenced via the remaining, intact switching network portions with only relatively slight blockage.

Thereby, the outputs of the switching units connected to one another are called tri-state outputs by means of which the binary values "1" and "0" as well as the quiescent state can be represented by three different signal levels. Whereas it is guaranteed in proper operation that two outputs connected to one another do not simultaneously assume the active condition during a time slot, in the activation phase, it can nonetheless occur which, when the binary value "1" is supplied from one input and the binary value "0" is supplied from the other input, can lead to destruction of the appertaining components of the switching units which form the outputs. It can also occur in the activation phase that the emission of free-channel code words transmitted during non-seized time phases does not properly operate, the emission normally proceeding from that switching unit from which a previously-existing connection had been triggered during the appertaining time slot.

SUMMARY OF THE INVENTION

It is therefore the object of the present invention to provide a time-division multiplex switching network which, like the network initially mentioned, avoids the disadvantages of multi-stage switching matrix arrays and, in addition, is also free of the problem of the inner connection of outputs of individual switching units.

The above-object is achieved, according to the present invention, given a time-division multiplex switching network of the type mentioned above, in that such a switching network, per switching network portion, comprises a plurality of further components, the plurality of further components being identical to the plurality of the switching units and the further components being of identical structure with the switching units, but the further components being operated as multiplexers in which the overall number of normally-used multiplexer outputs equal the number of time-division multiplex lines for the incoming transmission direction connected to a switching unit in the switching network portion and in which at least one portion of the outputs not exploited in the normal case is connected via normally-opened switches to a respective other normally-exploited multiplexer output of a different switching network portion and is exploited for information output when the other switching network portion fails.

A redundancy also exists in a time-division multiplex switching network conceived in such a manner, with the result that, given failure of a switching network portion, the traffic originally routed over the portion can be sequenced over the remaining coupling network portions given a minimal blocking. The difficulties given the connection of tri-state outputs described above are eliminated, since an interconnection of the normally non-exploited outputs of the components, operated as multiplexers, to the multiplexer outputs of components of the appertaining, failed switching network portion, only occurs in the case of a fault, i.e. when a switching network portion fails.

According to a particular feature of the invention, the individual switching network portions are independent of one another with respect to power supply and clock supply, so that the most frequent causes of fault, in particular, defects in the current or clock supply, only respectively affect parts of the switching network and the overall operation is only relatively slightly disruptive in the case of a fault because of the possibilities of the low-blockage acceptance of the traffic by other switching network portions.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 3 is a schematic representation of a second exemplary embodiment of a time-division multiplex switching network, constructed in accordance with the present invention, which comprises four switching network portions.

DESCRIPTION OF THE PREFERRED EMBODIMENTS

Figure 1:
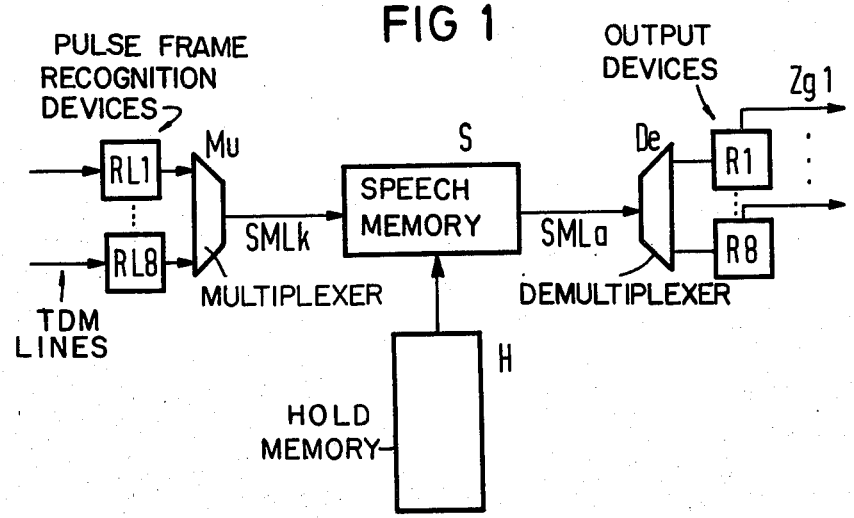
FIG. 1 is a schematic illustration of an exemplary format of a switching unit, in which the switching network is based upon multiple employment of the unit.

The switching unit according to FIG. 1 serves for the connection of eight time-division multiplex lines. Accordingly, the eight line pairs Zk1–Zk8 for the incoming transmission direction are illustrated at the left-hand side of the drawing, whereas the appertaining pairs Zg1–Zg8 for the outgoing transmission direction are illustrated at the right-hand side of the drawing. A device RL1–RL8 which serves for pulse frame recognition for the delay time compensation is assigned to each of the time-division multiplex line pairs Zk1–Zk8. The information derived from the individual line lead pairs for the incoming transmission direction which have passed through the devices RL are chronologically interlaced by a multiplexer Mu and are further transmitted in this form on a supermultiplex line SMLk for the incoming transmission direction. Assuming a bit clock frequency of 2.048 Mbit/s on the individual line lead pairs for the incoming transmission direction, a bit clock frequency of $8 \times 2.048$ Mbit/s prevails on the supermultiplex line SMLk.

The heart of the switching unit according to FIG. 1 is a time switching stage which comprises a speech memory S and a hold memory H serving for the drive of the speech memory S. The speech memory S has a memory cell for each of the simultaneously-possible connections, in the case of eight connected time-division multiplex lines on which 32 time channels are respectively formed, i.e. 128 memory cells at eight bit each. Each of the memory cells is driven twice on the basis of a sample pulse frame, namely once at the time slot allocated to a subscriber A and once to the time slot allocated to the subscriber B of this connection. For this reason, the hold memory H exhibits twice the number of memory cells, so that the addresses of the memory cells of the speech memory S can each be stored twice. The incoming information are supplied to the speech memory S via the supermultiplex line SMLk. After corresponding temporary storage, there are served via the supermultiplex line SMLa for the outgoing transmission direction and are supplied to a demultiplexer De which distributes the same to the eight-line lead pairs Zg1–Zg8.

The read out from the speech memory S of the switching unit of FIG. 1 is controlled in such a manner that the temporary storage not only bridges time intervals between time slots of time channels employed on incoming time-division multiplex lines and time slots of time channels employed on outgoing time-division multiplex lines but, rather, chronological shifts are also undertaken between time intervals which are assigned on the supermultiplex lines within the time slots of the time channels to the individual, connected time-division multiplex lines for the incoming transmission direction or the outgoing transmission direction, respectively. The cyclical distribution of the contents of the time intervals to the individual time-division multiplex lines for the outgoing transmission direction by the demultiplexer De therefore also leads to a corresponding spatial switching.

Figure 2:
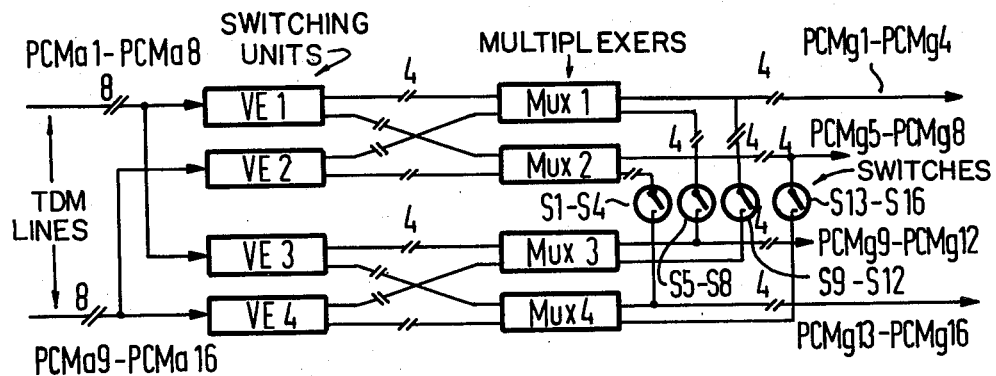
FIG. 2 is a schematic diagram of a first exemplary embodiment of a time-division multiplex switching network, constructed in accordance with the present invention, which comprises two switching network portions.

The time-division multiplex switching network according to the present invention and illustrated in FIG. 2 comprises two switching network portions which respectively comprise two switching units VE1 and VE2 or, respectively, VE3 and VE4. These switching units are constructed such that they have eight connections for time-division multiplex lines for the incoming transmission direction and eight connections for the time-division multiplex lines for the outgoing transmission direction.

Overall, 16 time-division multiplex lines PcMa1–PCMa16 are connected to the switching units, in particular, the first eight time-division multiplex lines PCMa1–PCMa8 are connected to the eight inputs of the switching unit VE1 of the first portion of the switching network and to the eight inputs of the switching unit VE3 of the other portion of the switching network. The remaining eight time-division multiplex lines. PCMa9–PCMa16 for the incoming transmission direction are connected to the inputs of the other switching unit VE4 of the second switching network portion and to the eight inputs of the other switching unit VE2 of the first switching network portion.

In addition to the plurality of switching units VE1–VE4, an identical plurality of structural units Mux1–Mux4 are provided as components of the time-division multiplex switching network, the structural units being identical in structure to the switching units being identical in structure to the switching units VE1–VE4; however, the units Mux1–Mux4 are operated as multiplexers.

Of the eight inputs of the structural units, respectively four are connected to outputs of each of the switching units VE of the same portion of the switching network. Therefore, for example, four inputs of the structural unit Mux1 are connected to four outputs of the switching unit VE1 and the four other inputs of the structural unit Mux1 are connected to four outputs of the switching unit VE2.

Of the eight outputs of the structural units Mux1–Mux4, normally only four are respectively exploited for the connection of time-division multiplex lines PCMg, so that, corresponding to the plurality of time-division multiplex lines PCMa for the incoming transmission direction, overall 16 time-division multiplex lines PCMg1–PCMg16 for the outgoing transmission direction are connected.

The respectively remaining four outputs of the structural units Mux1–Mux4 can be respectively connected via a respective switch S1–S16 to one of the outputs of a structural unit Mux of the respectively other switching network portion at which time-division multiplex lines PCMg for the outgoing transmission direction are normally connected. Therefore, for example, the four remaining outputs of the structural unit Mux1 which belong to the first portion of the switching network can be connected via switches S5–S8 to a respective other output of the outputs of the structural unit Mux3 belonging to the second portion of the switching network, to which structural unit Mux3 the time-division multiplex lines PCMg9–PCMg12 for the outgoing tramsmission direction are connected.

In the normal case, the switches S1–S16 are opened and, as shall be explained below, are only closed when one of the switching network portions fails.

The mode of operation of the structural units Mux-1–Mux4 as multiplexers means that a through-connection to their four normally-exploited outputs is respectively possible proceeding from only two inputs, of which one is connected to an output of the first switching unit VE and the other is connected to an output of the second switching unit VE of the appertaining portion of the switching network. Thereby, the through-connection occurs in cyclical interlacing. An analogous case applies for the normally non-exploited outputs, so that a structural unit Mux therefore respectively comprises two groups of four multiplexers which respectively combine the PCM information occurring on two time-division multiplex lines connected at the input side.

In normal operation, i.e. when both switching networks are intact, it is assumed that the switches S1–S16 are opened. The information transmitted on the time-division multiplex lines for the PCMa1–PCMa16 for the incoming transmission direction are distributed to the two portions of the switching network. Since, as mentioned above, the switching units VE1–VE4 guarantee full accessibility, i.e. can respectively master the traffic of eight connected time-division multiplex lines for the incoming transmission direction, the switching units in the normal case are not fully loaded, even given the highest occurrence of traffic.

If a switching network portion fails, for example, the switching network portion comprising the switching units VE3 and VE4 and the structural units Mux3 and Mux4 operated as multiplexers, then, by means of a corresponding control command, the switches S1–S8 are closed to connect the normally non-exploited outputs of the structural units Mux1 and Mux2 of the first switching network portion to those outputs of the second switching network portion to which the time-division multiplex lines PCMg9–PCMg16 for the outgoing transmission direction are connected.

That portion of the traffic that heretofore was sequenced to the time-division multiplex lines PCMg9–PCMg16 for the outgoing transmission direction over the second portion of the switching network, whereby it can be a matter of PCM information supplied both on the time-division multiplex lines PCMa1–PCMa8 for the incoming transmission direction as well as on the time-division multiplex lines PCMa9–PCMa16, is now exclusively conducted via the first portion of the switching network and via the corresponding switches S1–S8 to the multiplex lines for the outgoing transmission direction. Because of the over-dimensioning of the switching units of the switching network portions, with respect to traffic, existing in the normal case, blockages which may occur are thereby held to a minimum.

The problems incurred in the interconnection of outputs during normal operation in the known time-division multiplex switching matrix array initially mentioned cannot occur in the interconnection of outputs of the structural units Mux1–Mux4 occurring only in the alternate switching case.

The exemplary embodiment of the time-division multiplex switching network according to FIG. 3 and constructed in accordance with the present invention comprises four switching network portions. Accordingly, the switching network portions respectively comprise four of the actual switching units VE as well as the same number of structural units Mux identical in structure to the switching units VE but operated as multiplexers. In a manner analogous to the exemplary embodiment of FIG. 2, the inputs of the switching units VE are connected to the time-division multiplex lines PCMa1–PCMa32 for the incoming transmission direction, in particular, in such a manner that each of the time-division multiplex lines is connected to a respective other input of the switching unit VE of each switching network portion. Therefore, for example, the time-division multiplex lines PCMa1–PCMa8 for the incoming transmission direction are respectively connected to a respective one of the eight inputs of the switching unit VE1 of the first switching network portion, of the switching unit VE5 of the second switching network portion, of the switching unit VE9 of the third switching network portion and of the switching unit VE13 of the fourth switching network portion.

The connection between the outputs of the switching units VE and the inputs of the structural units Mux operated as multiplexers within the individual switching network portions is such that each switching unit VE is connected via two respective intermediate lines to each structural unit Mux.

In the normal case, two outputs at each of the structural units Mux are utilized, at which the 32 time-division multiplex lines PCMg1–PCMg32 for the outgoing direction are connected.

Two additional, normally non-exploited outputs of the structural units Mux are connected by way of a respective switch S to equivalent outputs of a structural unit Mux of another switching network portion. Therefore, for example, two further outputs of the structural unit Mux1 of the first switching network portion are connected via switches S11 and S12 to the outputs of the structural unit Mux2 in the second switching network portion at which the time-division muliplex lines PCMg9 and PCMg10, respectively, for the outgoing transmission direction are connected. In an analogous manner, normally non-exploited outputs of the remaining structural units in the first switching network portion are connected to outputs of the remaining structural units in the second switching network portion, just as normally non-exploited outputs of the structural units Mux in the second switching network portion can be connected via switches S to outputs of structural units in the first switching network portion at which the time-division multiplex lines PCMg for the outgoing transmission direction are connected.

The same holds true for the mutual connection of outputs of the structural units Mux which belong to the third and fourth switching network portions.

The remaining four outputs of the structural units Mux are unexploited in any case in the exemplary embodiment according to FIG. 3.

In normal operation, the traffic arising via the time-division multiplex lines PCMa1–PCMa32 for the incoming transmission direction is also distributed to the four switching network portions depending upon which time-division multiplex line PCMg for the outgoing transmission direction is to be connected. In case of the failure of a switching network portion, the traffic originally sequenced across that portion is co-assumed by that switching network portion given which, proceeding from the structural units Mux via the switches S, those outputs of the failed switching network portion can be reached at which the time-division multiplex lines for the outgoing transmission direction are connected.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A time-division multiplex switching network, comprising:
   a plurality of switching units, constructed as time stages, arranged in separate groups, and operable to chronologically and spatially assign time channels;
   a respective plurality of time-division multiplex lines for an incoming transmission direction connected to said switching units, such that the lines connected to a switching unit of one group are also connected to a corresponding switching unit in each other group;
   per switching unit group, a plurality of multiplexers equal in number to the number of switching units and each including a plurality of inputs, a plurality of normally-used outputs equal in number to the number of said incoming lines connected to a switching unit, and a plurality of normally-unused outputs, said inputs of each of said multiplexers divided into groups of equal number and each such group connected to a like number of outputs of said switching units such that each switching unit of a switching unit group is connected to each multiplexer assigned to that switching unit group; and
   a plurality of normally-open switches connected between at least a portion of said normally-used outputs and corresponding normally-used outputs and operated when the respective switching portion fails.

2. The time-division switching network of claim 1, wherein said multiplexers are constructed identical to said switching units.

3. The time-division switching network of claim 1, comprising:
   a respective independent power supply and a respective independent clock supply for each of the groups.

* * * * *